United States Patent [19]

Yan et al.

[11] Patent Number: 5,181,152
[45] Date of Patent: Jan. 19, 1993

[54] LEADING EDGE UNDERSHOOT ELIMINATION IN THIN FILM HEADS

[75] Inventors: Ying D. Yan, Burnsville; John Bortins, Bloomington; Beat G. Keel, Prior Lake; Nurul Amin, Burnsville, all of Minn.

[73] Assignee: Seagate Technology Inc., Scotts Valley, Calif.

[21] Appl. No.: 660,410

[22] Filed: Feb. 22, 1991

[51] Int. Cl.[5] .............................................. G11B 5/147
[52] U.S. Cl. ..................................... 360/126; 360/122
[58] Field of Search ................ 360/126, 122, 123, 125

[56] References Cited

U.S. PATENT DOCUMENTS 4,636,901 1/1987 Ohura et al. ........................ 360/126
4,992,897 2/1991 Deroux-Dauphin ................ 360/103

Primary Examiner—John H. Wolff
Attorney, Agent, or Firm—Kinney & Lange

[57] ABSTRACT

A thin film magnetic read/write head deposited upon a non-magnetic substrate reduces leading edge undershoots in readback pulse signal. A magnetic layer is deposited between the thin film magnetic read/write head and the non-magnetic substrate. Undershoots are reduced by making the leading edge of the thin film head less sensitive to the magnetization transitions in a magnetic storage medium.

14 Claims, 8 Drawing Sheets

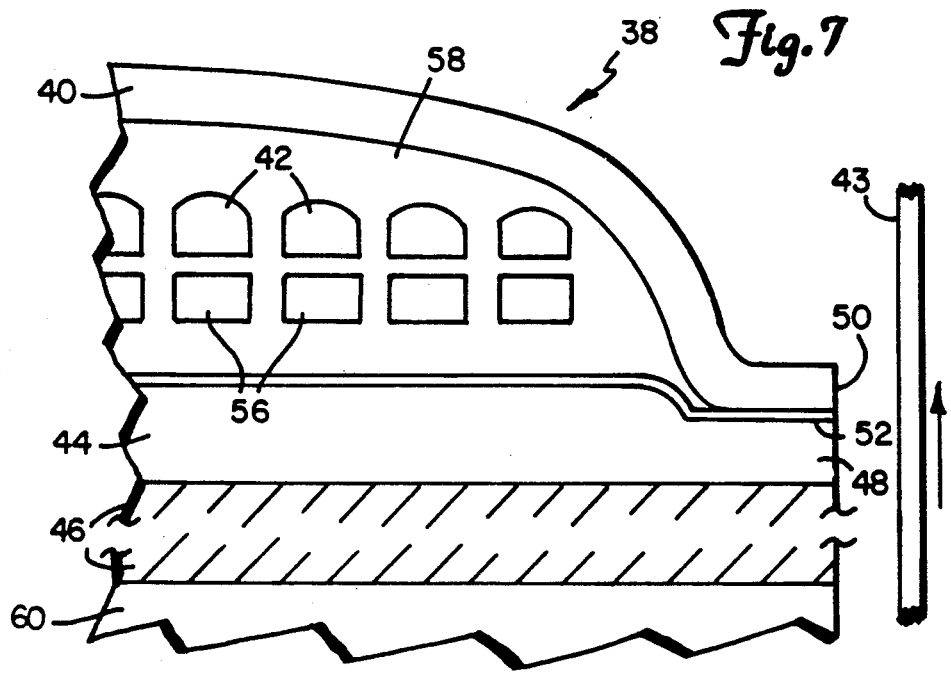
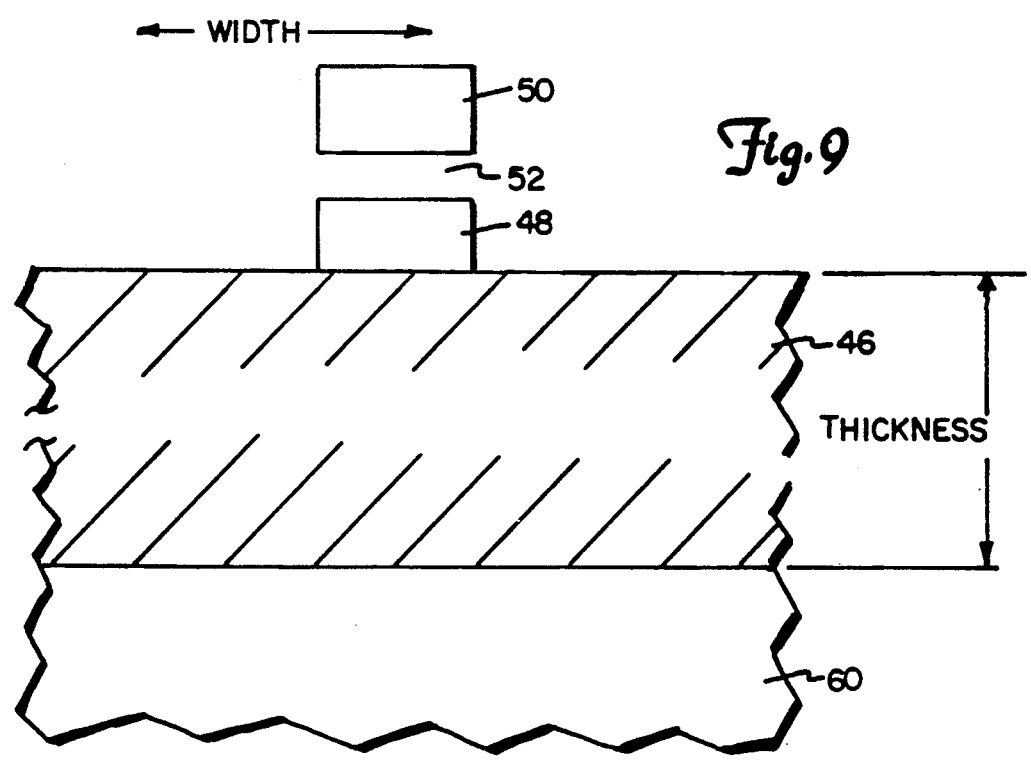

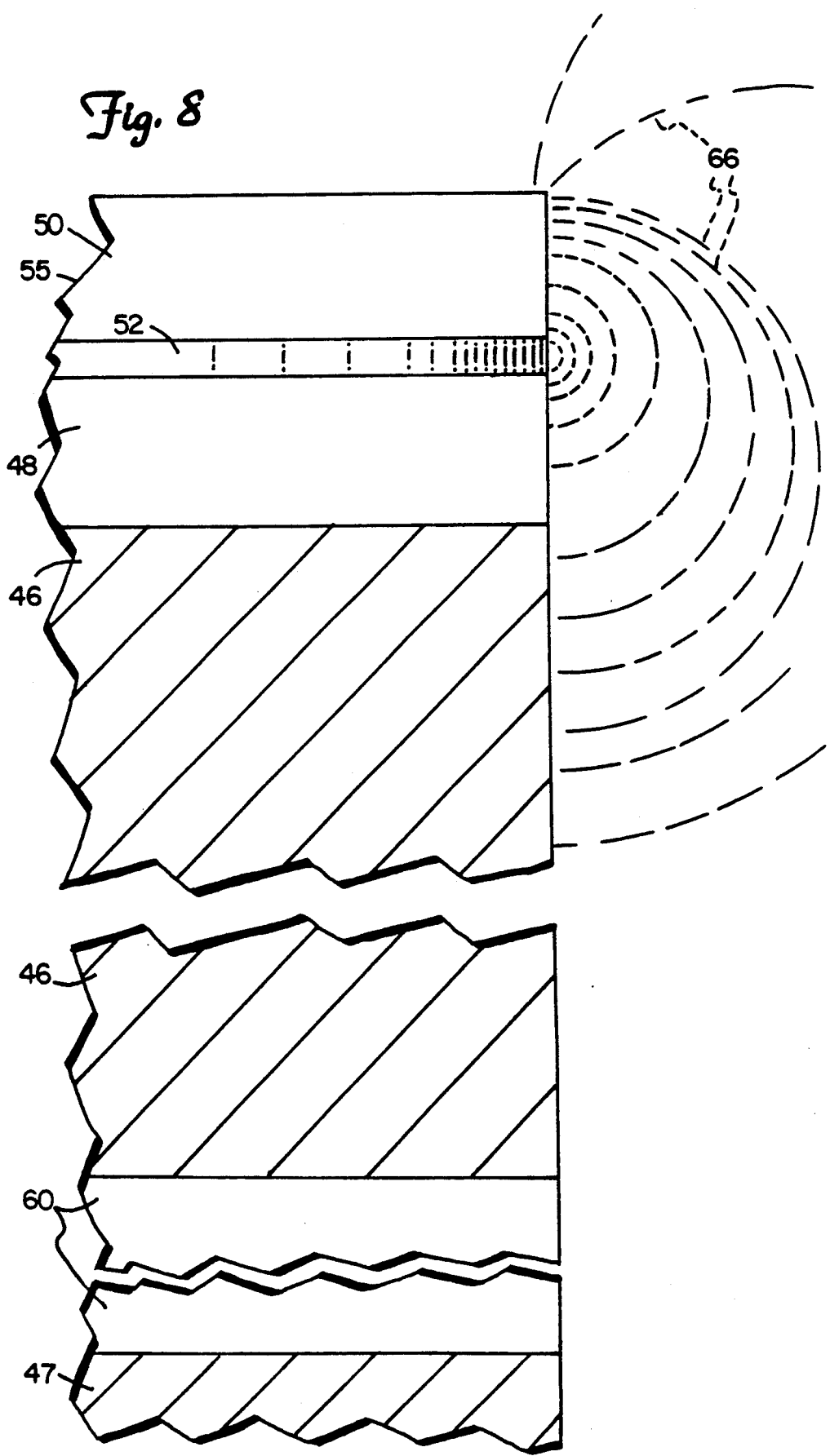

LEADING EDGE UNDERSHOOT ELIMINATION IN THIN FILM HEADS

BACKGROUND OF THE INVENTION

The present invention relates to thin film magnetic recording heads. In particular, the invention relates to an improved thin film magnetic head design which reduces undershoot or inter-symbol interference.

In a magnetic storage system, such as a computer disk drive, digital information is magnetically stored upon the surface of a magnetic medium such as a magnetic storage disk. The digital information is represented by selectively polarizing the magnetic field of consecutive areas across the surface of the rotating magnetic disk. When this information is read back from the storage disk, the magnetic polarization of the medium is sensed as an electrical output signal. The electrical output signal is representative of both the relative strength of the magnetization in the media, and the magnetic field pattern of the read head. The readback signal comprises a series of superimposed symbols whose existence and location are used to represent digital information. The read and write operations are performed by a magnetic read/write head which is flying over the surface of the rotating disk.

Thin film transducers sense the recorded magnetic transitions primarily as these transitions pass in front of the transducer gap. This is an isolated readback pulse. However, Thin Film Transducers sense the recorded magnetic transitions not only as these transitions pass in front of the transducer gap but also when the transitions pass the leading and trailing edges of the transducer pole faces. A single transition thus produces a small leading signal pattern commonly called leading edge undershoot, a main signal called the gap response and then a small trailing signal pattern called trailing edge undershoot.

In disc storage applications, where the transition velocity varies as a function of radial distance from disc center, the positions of these undershoots relative to main signal is not constant. This makes electronic compensation difficult. In the absence of effective compensation these undershoots reduce the signal to noise ratio and tend to degrade data recovery, thus increasing the error rate of the recording system.

Reducing the amplitude of these leading/trailing edge signals or eliminating them totally would improve signal integrity and the error rate of a data recording system.

SUMMARY OF THE INVENTION

The present invention provides an improved thin film magnetic head which minimizes leading edge undershoots in isolated read back pulses. The present invention reduces leading edge undershoots by making the leading edge of the transducer less sensitive to the magnetization transitions in the recording medium.

In the present invention, the leading edge undershoot (or trailing, depending on the direction of travel of the magnetic medium relative to the magnetic head) is virtually eliminated by depositing a layer of magnetic material on a non-magnetic substrate prior to depositing a thin film magnetic head.

In preferred embodiments, the magnetic layer comprises a thick layer of nickel iron alloy. The thickness should be in a range of about 6 micrometers to about 15 micrometers. A thin film magnetic head is then deposited upon the magnetic layer. The structure of the present invention eliminates a reversal in the direction of magnetic flux at the outside leading edge of the thin film magnetic head.

BRIEF DESCRIPTION OF THE DRAWINGS

FIG. 7 is a cross sectional view of a portion of the thin film magnetic head of FIG. 6 taken along the line labeled 7—7 relative to a surface of a magnetic medium.

FIG. 8 shows a magnetic flux diagram for the thin film head of the present invention.

FIG. 9 shows an air bearing surface from FIG. 8.

DETAILED DESCRIPTION OF THE PREFERRED EMBODIMENTS

Figure 1:
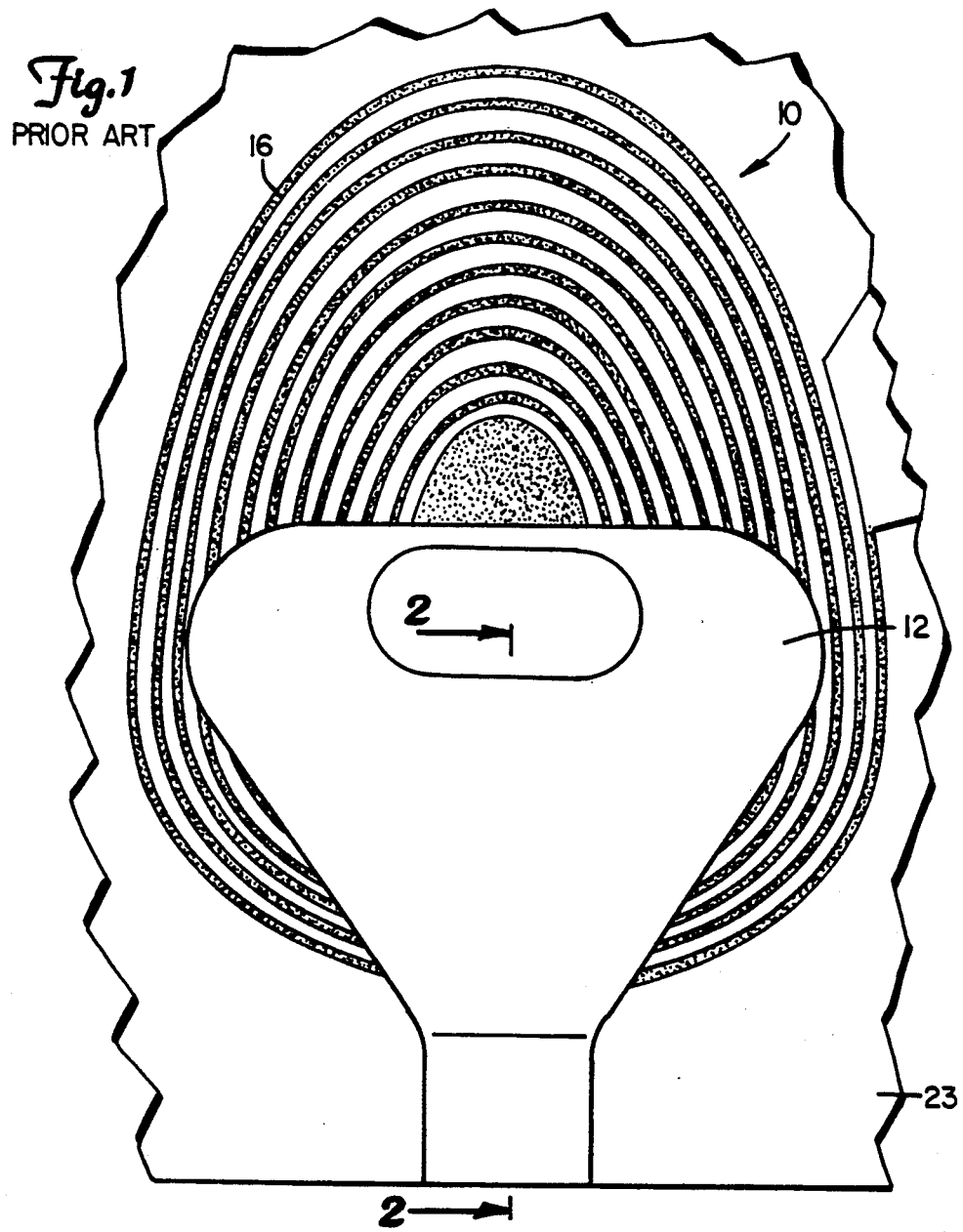
FIG. 1 shows a top plan view of a prior art thin film magnetic head.
Figure 2:
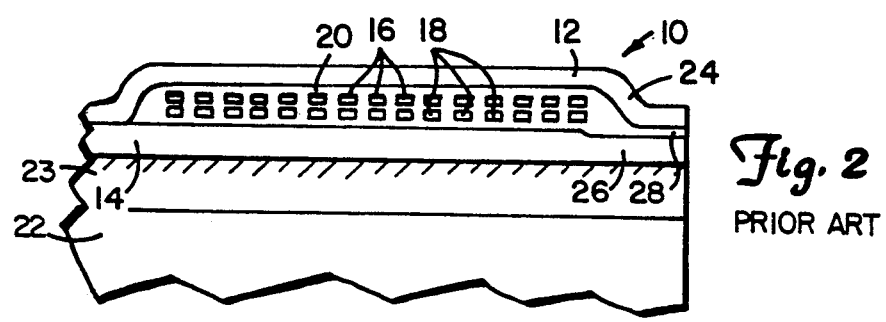
FIG. 2 is a cross sectional view of the prior art thin film head of FIG. 1 taken along the line labeled 2—2.

A prior art multi-turn inductive thin film magnetic head 10 is shown schematically in FIGS. 1 and 2. FIG. 1 is a top view of prior art thin film head 10, and FIG. 2 is a side cross sectional view. Prior art thin film head 10 includes top and bottom magnetic thin film core legs 12 and 14 which comprise a nickel iron alloy. Photolithography is used to define the geometry of both top and bottom magnetic core legs 12 and 14. Conductive coils 16 and 18 extend between top and bottom magnetic thin film core legs 12 and 14 and are electrically insulated from top and bottom magnetic core legs 12 and 14 by an insulating layer 20. The back portions of conductors 16 and 18 are not shown in FIG. 2. Prior art thin film head 10 is deposited upon a layer 23 of non-magnetic, electrically non-conductive material such as $Al_2O_3$. This in turn is deposited on a non-magnetic substrate 22 comprising a ceramic compound such as $Al_2O_3$-TiC.

In fabricating prior art thin film head 10, several separate pattern transfer processes are used to deposit head 10 upon substrate 22. These transfer processes include chemical etching, plating and sputtering. A typical head fabrication process may account for more than a dozen masking levels and more than thirty processing steps.

During fabrication, heads similar to prior art thin film head 10 are deposited across the entire surface of substrate 22. After the layers of head 10 are deposited as depicted in FIGS. 1 and 2, substrate 22 is "diced" or sliced into many individual thin film heads, each carried by a portion of substrate 22 so that an upper pole tip 24, a lower pole tip 26 and a gap 28 are exposed. Pole tips 24 and 26 and gap 28 (and the portion of substrate 22 which underlies them) are then lapped in a direction generally inward, toward the center of thin film head 10, to achieve the desired dimensions. This lapping process is a mechanical process in which the exposed portion of top and bottom pole tips 24 and 26 and gap 28 are applied to an abrasive, such as a diamond slurry. Electrical contacts (not shown) are connected to conductors 16 and 18. The completed head is next attached to a support mechanism (not shown) for use in reading and writing data on a magnetic storage medium such as a computer disk.

Figure 3A:
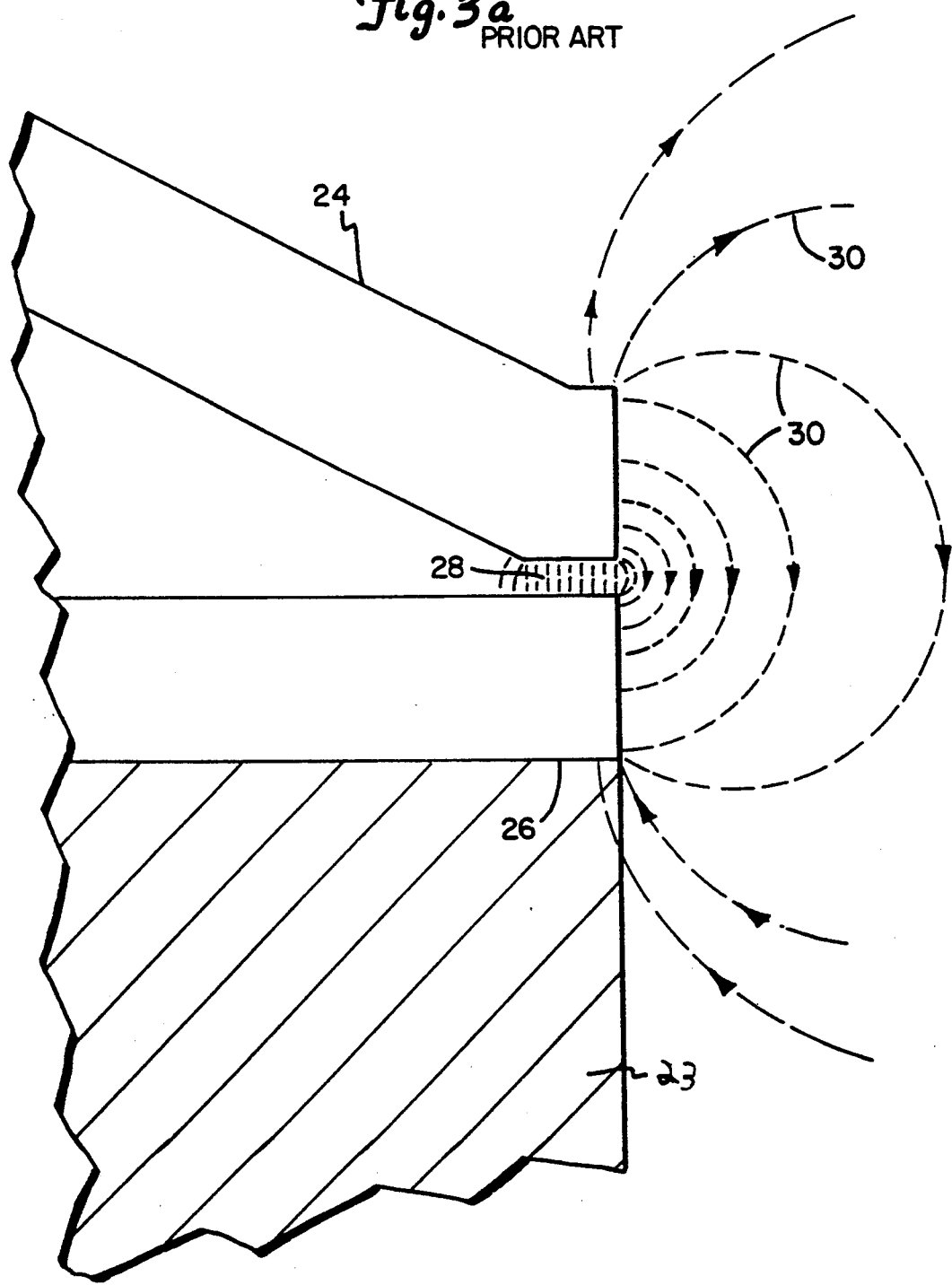
FIG. 3a shows a magnetic flux diagram for the prior art thin film magnetic head of FIG. 1.
Figure 4:
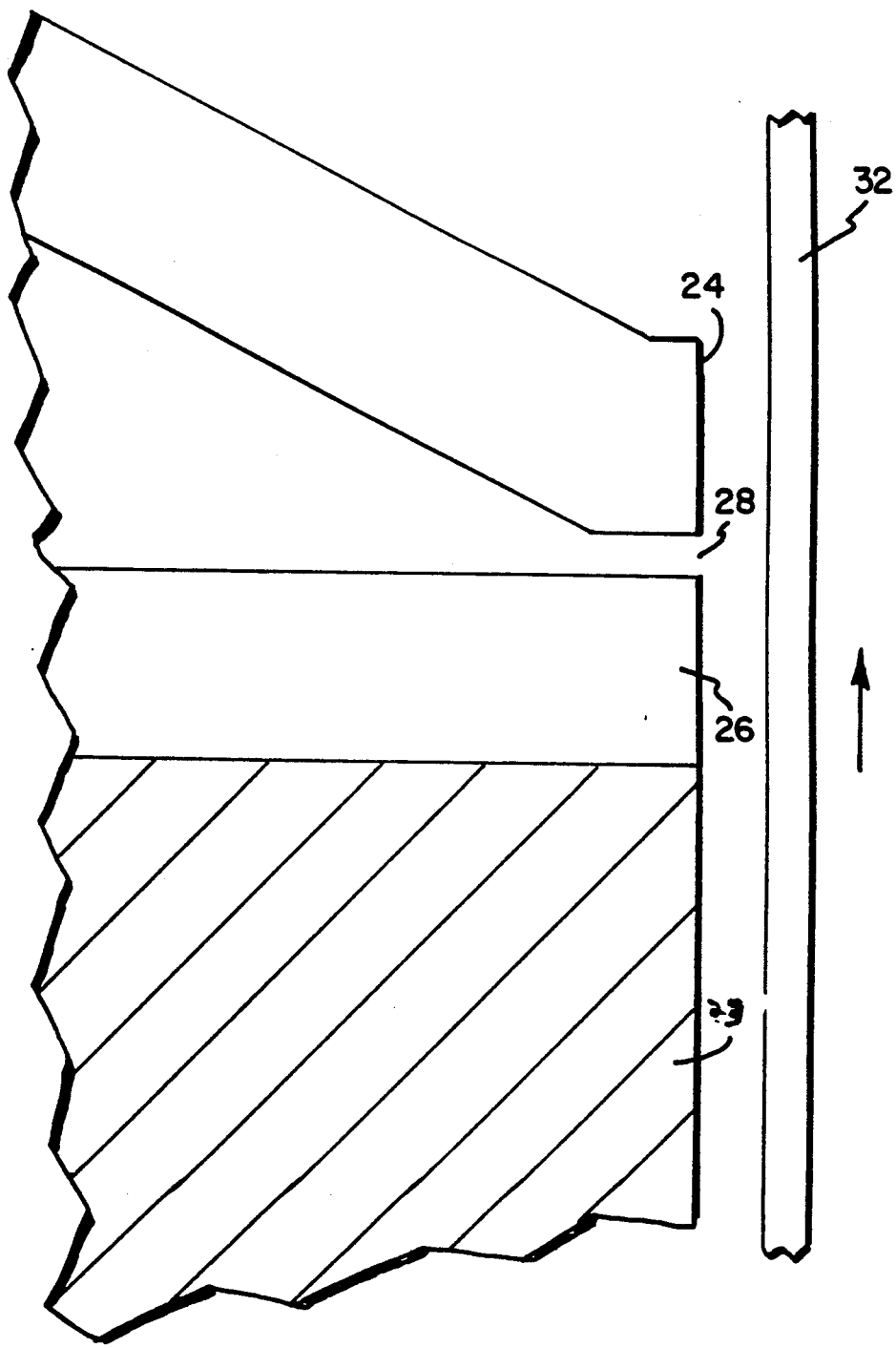
FIG. 4 shows the prior art thin film head of FIG. 1 relative to a surface of a magnetic medium.
Figure 3B:
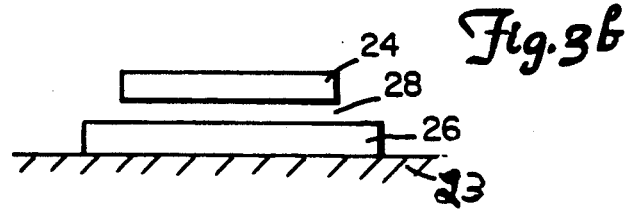
FIG. 3b shows the view of an air bearing surface corresponding to FIG. 3(a).

Following the lapping process in which pole tips 24 and 26 are lapped inward, the pole tip region resembles FIG. 3a. FIG. 3a shows the magnetic flux diagram for prior art thin film magnetic head 10 shown in FIG. 1. At the outer edges of upper pole tip 24 and lower pole tip 26, the direction of the magnetic flux reverses, as shown by the arrows, from the direction of the magnetic flux near the center of the fringe field. This flux reversal is due to the magnetic discontinuity at the outer boundaries of pole tips 24 and 26. FIG. 3b is a cross sectional view which shows the air bearing surface of the pole tips. FIG. 4 shows pole tips 24 and 26 of prior art thin film magnetic head 10 relative to a magnetic storage medium 32. Magnetic storage medium 32 moves in the direction indicated by the arrow in FIG. 4 relative to the pole tips of the prior art thin film head. Prior art thin film head 10 "flies" over the surface of magnetic medium 32 so that information can be written to and read from the surface of medium 32.

In operation, the thin film head flies above the disk with its pole tips 24 and 26. During a read operation, magnetic flux passes through the top and bottom magnetic film cores 12 and 14 around conductors 16 and 18. The magnetic field induces an electrical voltage across the coil conductors 16 and 18 which is detected by a high impedance differential amplifier. The voltage is proportional to the rate of change of magnetic flux linking the head coil emanating from the moving magnetic storage medium. During a write operation, an electrical current is caused to flow in conductor 16 or conductor 18. This electric current induces a magnetization in the top and bottom magnetic film cores 12 and 14 and causes a magnetic field to cross gap 28 between upper and lower pole tips 24 and 26. The construction of upper and lower pole tips 24 and 26 and gap 28 causes a fringe field to extend beyond the boundary of pole tips 24 and 26 and into the magnetic storage medium. This fringe field may be used to magnetize patterns in the storage medium and write information.

Figure 5:
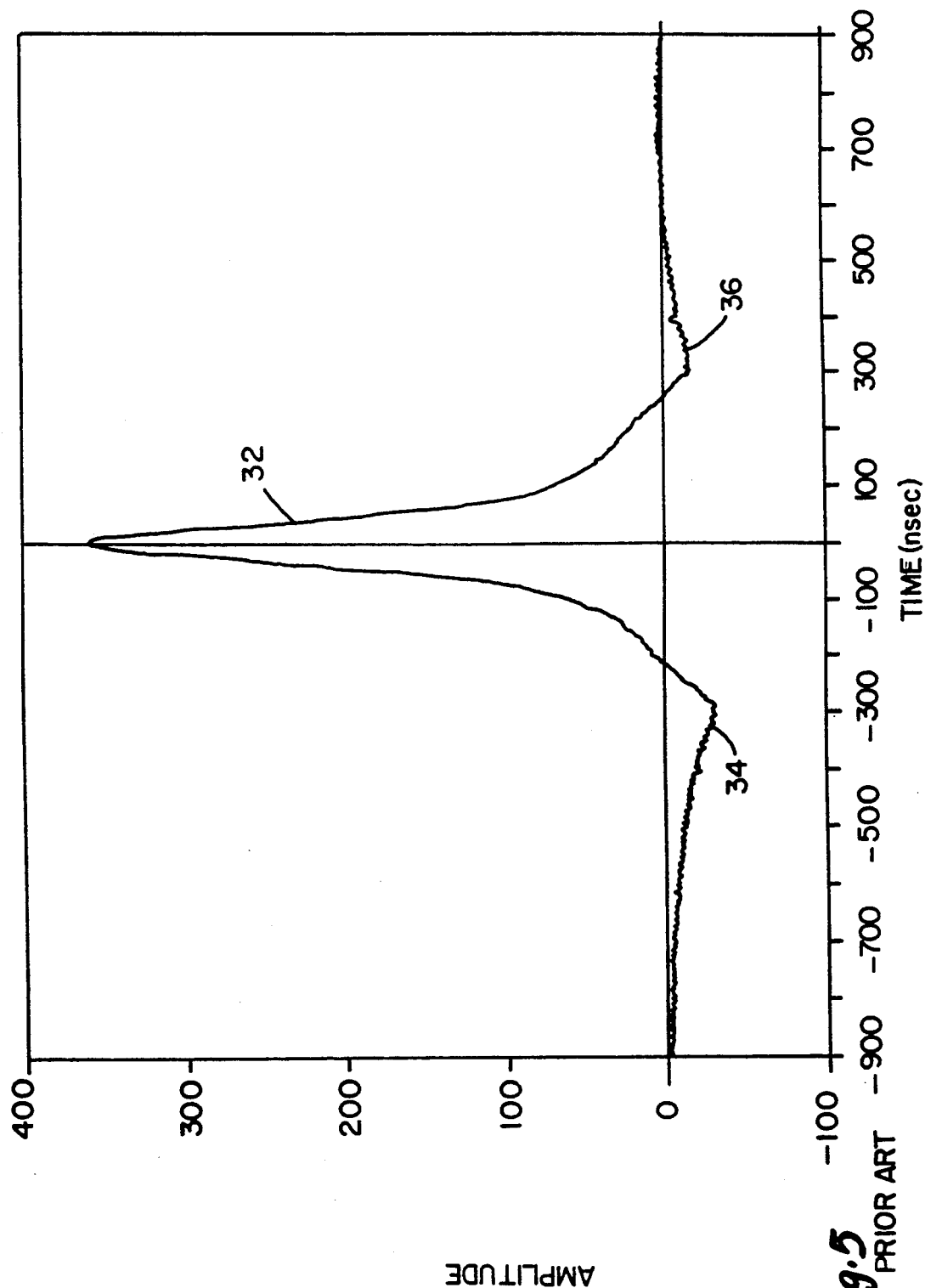
FIG. 5 shows an isolated readback pulse of the prior art thin film head shown in FIG. 4.

FIG. 5 shows a typical isolated readback pulse produced by a prior art thin film magnetic head such as that shown in FIG. 4. The signal is composed of the gap response 32, a leading discontinuity response (undershoot) 34 and a trailing discontinuity response (undershoot) 36. Undershoots 34 and 36 produced in a prior art thin film magnetic head cause adverse inter-symbol interference at high recording densities.

Figure 6:
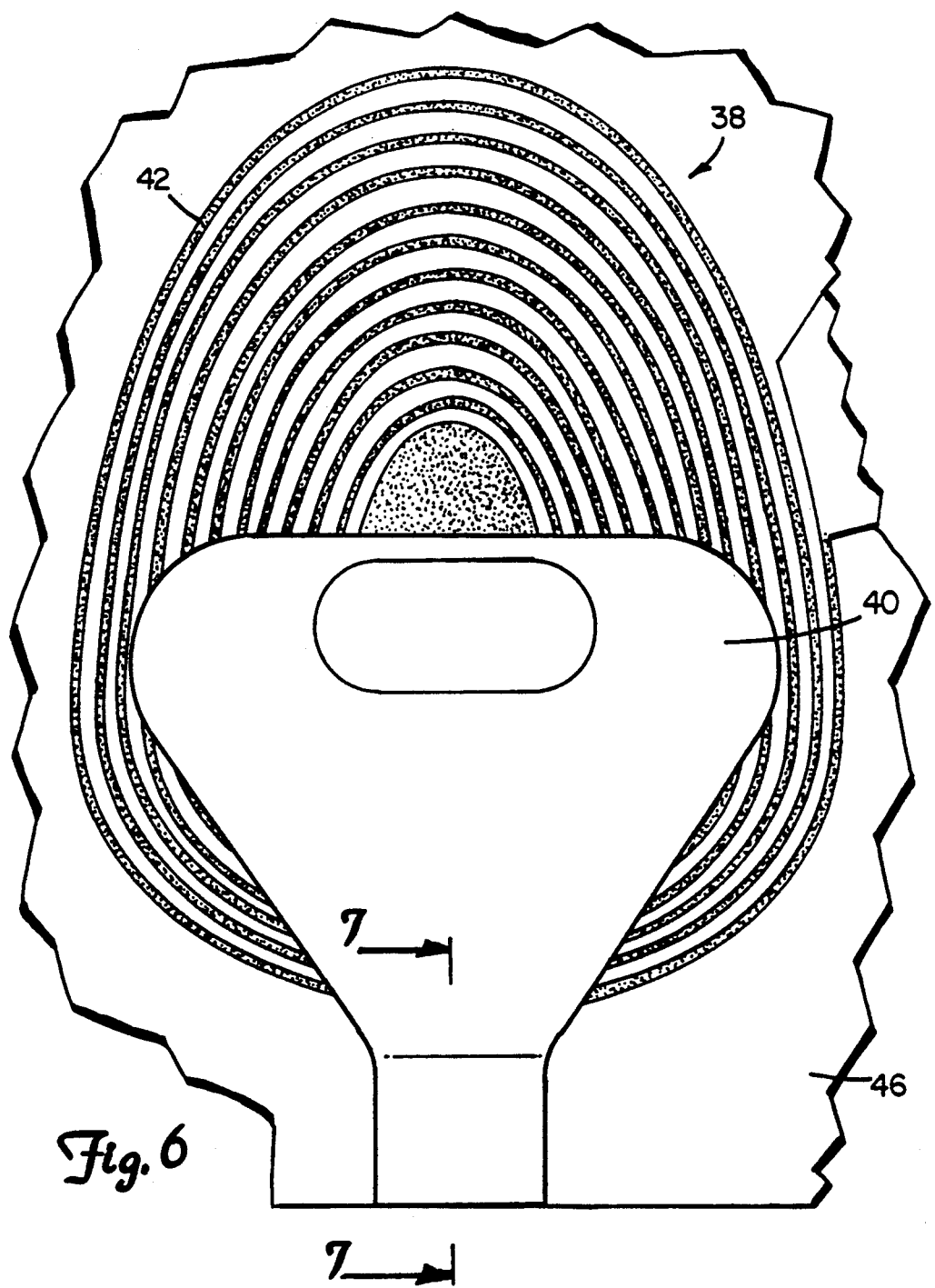
FIG. 6 shows a thin film magnetic head in accordance with the present invention.

FIGS. 6 and 7 show a thin film magnetic head 38 in accordance with the present invention, which reduces leading edge undershoots in the isolated readback pulse. Thin film head 38 includes top pole piece 40, coils 42 and 56, lower pole piece 44, magnetic layer 46, non-magnetic substrate 47 (shown in FIG. 8), lower pole tip 48, upper pole tip 50, gap layer 52, and insulation 58. Magnetic layer 46 is deposited on an alumina base coat 60.

FIG. 7 is a cross-sectional view of a portion of thin film head 38 shown in FIG. 6 taken along the line labeled 7—7 "flying" over a surface of a magnetic medium 43. Magnetic medium 43 moves relative to head 38 in the direction indicated by the arrow. Thin film magnetic had 38 includes lower pole piece 44 deposited upon magnetic layer 46 which covers non-magnetic base coat 60. The head is deposited upon non-magnetic substrate 47 (shown in FIG. 8). In a preferred embodiment of the present invention, magnetic layer 46 comprises, but is not limited to, NiFe. For example, magnetic layer 46 may comprise any ferrite material. Lower pole piece 44 includes lower pole tip 48. Upper pole piece 40 includes upper pole tip 50. Lower pole tip 48 and upper pole tip 50 are separated by a gap layer 52. Typically, all pole pieces are nickel iron and gap layer 52 is $Al_2O_3$. Coils 42 and 56 extend between upper pole 40 and lower pole piece 44.

FIG. 8 si a magnetic flux diagram for thin film magnetic head 38 shown in FIGS. 6 and 7 during a write operation. FIG. 8 shows upper pole tip 50 and lower pole tip 48 separated by gap layer 52. FIG. 8 shows magnetic flux lines 66 extending between top pole tip 50 and lower pole tip 48. When the magnetic flux pattern shown in FIG. 8 of thin film head 38 made in accordance with the present invention is compared with the prior art flux pattern shown in FIG. 3a, it is apparent that the flux reversal at the leading edge due to magnetic discontinuities is eliminated for the lower pole tip 48 in FIG. 8. By limiting the flux reversal in the magnetic flux pattern, the present invention greatly reduces leading edge undershoots in the isolated pulse signal associated with prior art thin film heads. Note, the isolated signal pulses reflect the shape of the head field due to a reciprocity principle.

FIG. 9 is a view of the air bearing surface of the pole tips of FIG. 8. FIG. 9 shows the directions of width and height dimensions at the air bearing surface of the head.

Figure 10:
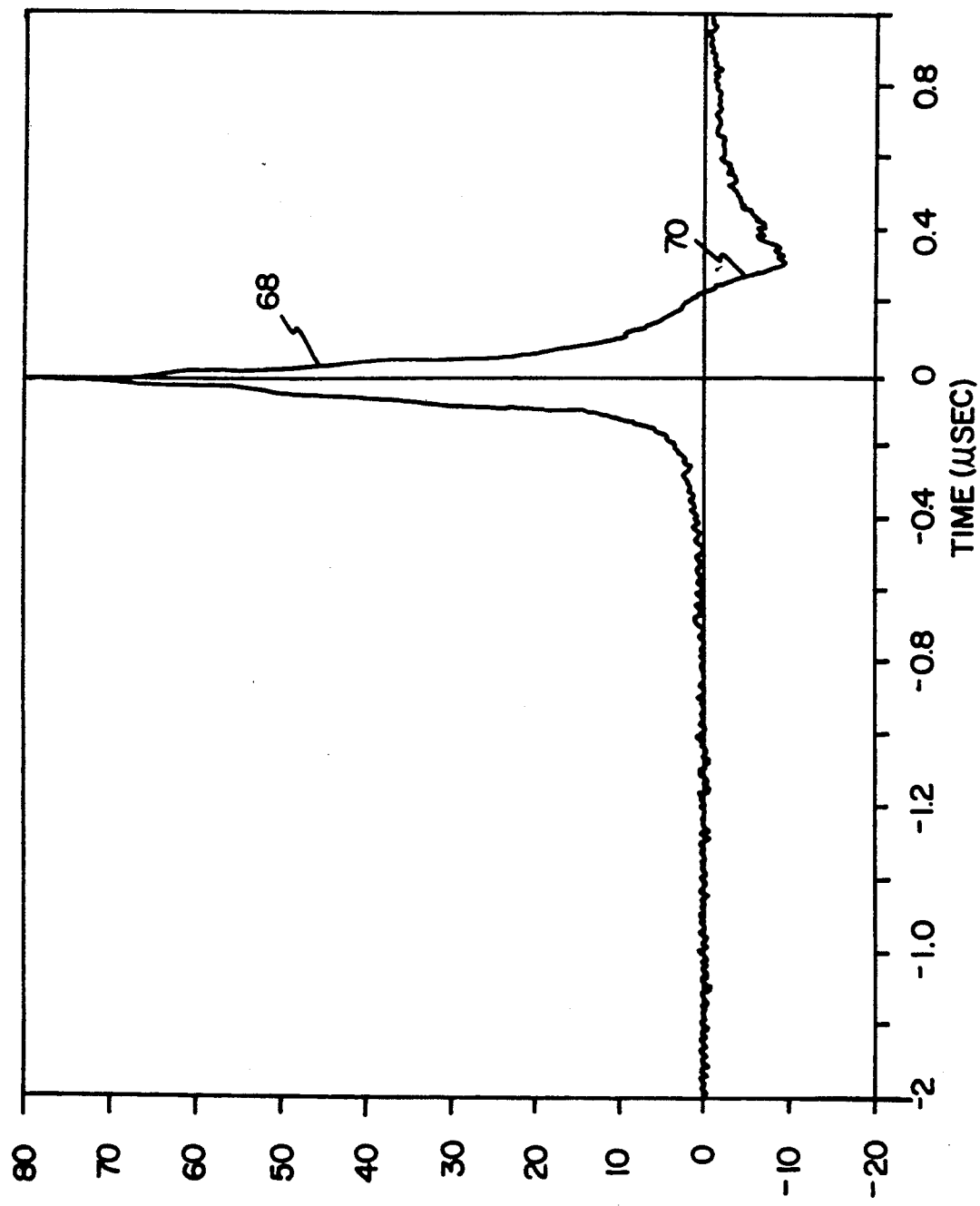
FIG. 10 shows an isolated readback pulse from a thin film head made in accordance with the present invention.

FIG. 10 shows an isolated pulse signal output during a read operation taken from a thin film magnetic head made in accordance with the present invention. FIG. 10 is a graph of time versus amplitude for the isolated pulse signal. FIG. 10 shows a gap response 68 and a small trailing undershoot 70. There is no leading undershoot apparent in FIG. 10.

In a preferred embodiment of the present invention, non-magnetic substrate 47 comprises $Al_2O_3$-TiC. Magnetic layer 46 comprises a layer of nickel iron which is plated on an alumina base coat 60. Gap layer 52 has a thickness in a range of about 0.1 micrometers to about 1.0 micrometers. Magnetic layer 46 should have a thickness in a range of about 2 micrometers to about 15 micrometers. The width at the air bearing surface should have an "infinite" magnetic width to spread the magnetic flux. Magnetic layer 46 should be wider than pole tips 48 and 50 and conductors 42 and 56. Magnetic layer 46 can be plated without a photoresist mask. However, if a photoresist mask is used it is possible to measure the thickness of the plated nickel iron. A photoresist mask also helps to reduce a stress effect which may lead to delamination of the layers. If a photoresist mask is used, magnetic layer 46 should be which may lead to delamination of the layers. If a photoresist mask is used, magnetic layer 46 should be wide enough so that the entire portion of conductors 42 and 56 lie above layer 46 and so that it still appears "infinite."

After magnetic layer 46 is deposited, lower pole tip 48 can be deposited. Lower pole tip 48 should have a thickness in a range of about 1 micrometer to about 4 micrometers. Lower pole tip 48 helps improve the read sensitivity of thin film head 38. In subsequent processing steps, if a nickel iron etch is used, care should be taken to avoid damage to magnetic layer 46. The remaining layers of thin film magnetic head 38 are deposited using thin film deposition techniques.

The present invention offers significant advantages over prior art thin film magnetic heads. The present invention uses an extra magnetic layer to reduce leading edge undershoots in the isolated readback pulse. By reducing the undershoots, the present invention allows for higher data densities over prior art thin film had designs using common detection circuitry because the inter-symbol interference caused by complicated superposition of readback pulses is reduced.

Although the present invention has been described with reference to preferred embodiments, workers skilled in the art will recognize that changes may be made in form and detail without departing from the spirit and scope of the invention.

What is claimed is:

1. A thin film magnetic head comprising:
   a non-magnetic substrate;
   a magnetic layer deposited on the non-magnetic substrate, the magnetic layer having a width;
   a bottom pole piece deposited upon the magnetic layer and having a bottom pole tip, the bottom pole tip having a width which is substantially less than the width of the magnetic layer;
   a top pole piece over the bottom pole piece and having a top pole tip, the top and bottom pole pieces defining a high permeability magnetic flux path and a magnetic flux gap between the top pole tip and the bottom pole tip; and
   a plurality of conductors between the top pole piece and the bottom pole piece.

2. The thin film magnetic head of claim 1 wherein the magnetic layer comprises a ferrite material.

3. The thin film magnetic head of claim 1 wherein the magnetic layer comprises nickel iron.

4. The thin film magnetic head of claim 1 wherein the magnetic layer has a thickness in a range of about 2 micrometers to about 15 micrometers.

5. The thin film magnetic head of claim 1 wherein the bottom pole tip has a thickness in a range of about 1 micrometer to about 4 micrometers.

6. The thin film magnetic head of claim 1 wherein the magnetic layer has a magnetically substantially infinite width with respect to the bottom pole tip.

7. The thin film magnetic head of claim 1 including a non-magnetic gap layer between the top and bottom pole tips, wherein the gap layer has a thickness in a range of about 0.1 micrometers to about 0.5 micrometers.

8. A thin film magnetic head comprising:
   a non-magnetic substrate;
   a magnetic layer deposited on the non-magnetic substrate, the magnetic layer having a width;
   a bottom pole tip deposited upon the magnetic layer and having a width which is substantially less than the width of the magnetic layer; and
   a top pole tip over the bottom pole tip, the top and bottom pole tips defining a high permeability magnetic flux path and a magnetic flux gap between the top pole tip and the bottom pole tip.

9. The thin film magnetic head of claim 8 wherein the magnetic layer comprises a ferrite material.

10. The thin film magnetic head of claim 8 wherein the magnetic layer comprises nickel iron.

11. The thin film magnetic head of claim 8 wherein the magnetic layer has a thickness in a range of about 2 micrometers to about 15 micrometers.

12. The thin film magnetic head of claim 8 wherein the bottom pole tip has a thickness in a range of about 1 micrometer to about 4 micrometers.

13. The thin film magnetic head of claim 8 wherein the magnetic layer has a magnetically substantially infinite width with respect to the bottom pole tip.

14. The thin film magnetic head of claim 8 including a non-magnetic gap layer between the top and bottom pole tips, wherein the gap layer has a thickness in a range of about 0.1 micrometers to about 0.5 micrometers.

* * * * *

UNITED STATES PATENT AND TRADEMARK OFFICE
CERTIFICATE OF CORRECTION

PATENT NO. : 5,181,152

DATED : January 19, 1993

INVENTOR(S) : YING D. YAN, JOHN BORTINS, BEAT G. KEEL NURUL AMIN.

It is certified that error appears in the above-identified patent and that said Letters Patent is hereby corrected as shown below:

On the title page: Item [56] References Cited Section, under U.S. PATENT DOCUMENTS, insert the following:

```
4,239,587   12/1980   Koel et al.....156/659.1
4,422,118   12/1983   Helle et al....360/126
4,803,580    2/1989   Mowry..........360/113
4,943,879    7/1990   Takano et al...360/126
4,951,166    8/1990   Schewe.........360/119
4,970,615   11/1990   Gau............360/122
4,970,616   11/1990   Ramaswamy......360/122
```

Signed and Sealed this

Twelfth Day of April, 1994

*Attest:*

BRUCE LEHMAN

*Commissioner of Patents and Trademarks*

*Attesting Officer*